(12) United States Patent
Swain

(10) Patent No.: US 9,285,013 B2
(45) Date of Patent: Mar. 15, 2016

(54) METHOD AND APPARATUS FOR BALANCING A COMBINED WHEEL AND TIRE

(76) Inventor: Jeff Swain, Tallahassee, FL (US)

( * ) Notice: Subject to any disclaimer, the term of this patent is extended or adjusted under 35 U.S.C. 154(b) by 729 days.

(21) Appl. No.: 13/547,677

(22) Filed: Jul. 12, 2012

(65) Prior Publication Data

US 2014/0015306 A1  Jan. 16, 2014

(51) Int. Cl.
*B60B 1/06* (2006.01)
*F16F 15/34* (2006.01)

(52) U.S. Cl.
CPC ......... *F16F 15/345* (2013.01); *Y10T 29/49492* (2015.01)

(58) Field of Classification Search
CPC .......... F16F 15/32; F16F 15/324; F16F 15/34
USPC ................................. 301/5.21, 5.22
See application file for complete search history.

(56) References Cited

U.S. PATENT DOCUMENTS

| | | | |
|---|---|---|---|
| 2,771,240 A * | 11/1956 | Gurin | 416/145 |
| 2,955,876 A | 10/1960 | Kinsey | |
| 3,280,637 A | 10/1966 | Ealey | |
| 3,799,618 A * | 3/1974 | Martinoli | 301/5.21 |
| 3,913,980 A * | 10/1975 | Cobb, Jr. | 301/5.22 |
| 4,969,692 A | 11/1990 | Yung | |
| 5,142,936 A * | 9/1992 | McGale | 74/570.2 |
| 5,350,220 A | 9/1994 | Atwell, Jr. | |
| 7,192,096 B2 | 3/2007 | Fogal, Sr. | |
| 2003/0117006 A1 | 6/2003 | Kogure | |
| 2007/0236076 A1 | 10/2007 | Tong | |
| 2010/0123350 A1* | 5/2010 | McNeill | 301/5.22 |

* cited by examiner

*Primary Examiner* — S. Joseph Morano
*Assistant Examiner* — Jean Charleston
(74) *Attorney, Agent, or Firm* — J. Wiley Horton

(57) ABSTRACT

A vehicle wheel is provided with a plurality of tube's distributed at various radial angles from the center and oriented generally transversely of the central plane of the wheel and generally parallel to the wheel's axis of rotation. The azimuthal and longitudinal imbalance of a mounted tire including the wheel is determined. To balance the mounted tire both azimuthally and longitudinally, one or more weights are inserted into one or more tubes disposed on the wheel at appropriate azimuthal locations. The weights are placed longitudinally of the tubes in the plane of central mass of the mounted tire, and are secured in that position within the tube by any of a variety of means such as thread locking fluid, friction, or plugs.

13 Claims, 4 Drawing Sheets

METHOD AND APPARATUS FOR BALANCING A COMBINED WHEEL AND TIRE

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

TECHNICAL FIELD

The present invention relates to wheels and tires for vehicles such as automobiles, trucks, motorcycles, bicycles, airplanes, go-karts, and the like; more particularly, to methods and apparatus for rotationally balancing such wheels and tires, either on or off the respective vehicles; and most particularly, to a method and apparatus for installing balancing weights in the central plane of mass of a wheel or (more commonly) a wheel/tire combination (also referred to herein as a "mounted tire").

BACKGROUND OF THE INVENTION

Wheels and tires for vehicles as manufactured typically are not rotationally balanced. When a tire is mounted on a wheel and placed in service on a vehicle, rotational imbalance can result in undue vibration in the vehicle and rapid wear on the mounted tire leading to premature failure. Therefore, it is common practice to dynamically balance each mounted tire, either before or after installation on the vehicle, before the tire is placed in road service.

In the prior art as commonly practiced today, the mounted tire is mounted on a machine that determines through rotation both the degree of imbalance and the radial (also referred to herein equivalently as "azimuthal") location of the maximum imbalance. A technician then attaches one or more appropriate weights to the rim flange of the wheel at a point generally opposite from the maximum imbalance. Sometimes, the weight is divided between the inner rim flange and the outer rim flange of the wheel, or it may be installed entirely on the inner rim for cosmetic purposes.

This prior art method results in the mounted tire having a center of rotation that coincides with the axis of rotation of the vehicle axis. However, a source of imbalance still exists because the weights are not necessarily disposed in the central plane of mass of the mounted tire, perpendicular to the axis of rotation, placing a wobble tendency on the wheel bearings and resulting in a residual low level of rotational vibration. The prior art method can vary only the angular position of the weight and the amount of weight used. It cannot also vary the weight's position in the direction parallel to the wheel's axis of rotation (longitudinal), which is necessary to place the weights in the plane of central mass to eliminate this additional source of vibration and tire wear.

What is needed in the art is a method and apparatus wherein the balancing weight for a mounted tire is correctly disposed both azimuthally and longitudinally of the mounted tire.

It is a principal object of the present invention to eliminate both azimuthal and longitudinal vibrations in a mounted tire in road service on a vehicle.

It is a further object of the invention to increase the working mileage of a tire.

It is a still further object of the invention to improve the riding comfort of occupants of a vehicle.

SUMMARY OF THE INVENTION

Briefly described, in an exemplary embodiment in accordance with the present invention, a vehicle wheel is provided with a plurality of balancing tubes distributed at various radial angles from the center and oriented generally transversely of the plane of central mass of the wheel and generally parallel to the wheel's axis of rotation. The azimuthal and longitudinal imbalance of a mounted tire including the wheel is determined. To balance the mounted tire both azimuthally and longitudinally, one or more weights are inserted into one or more balancing tubes disposed on the wheel at appropriate azimuthal locations. The weights are placed longitudinally of the balancing tubes in the plane of central mass of the mounted tire, and are secured in that position within the balancing tube by any of a variety of means such as thread locking fluid or plugs.

BRIEF DESCRIPTION OF THE DRAWINGS

The present invention will now be described, by way of example, with reference to the accompanying drawings, in which.

Figure 1:
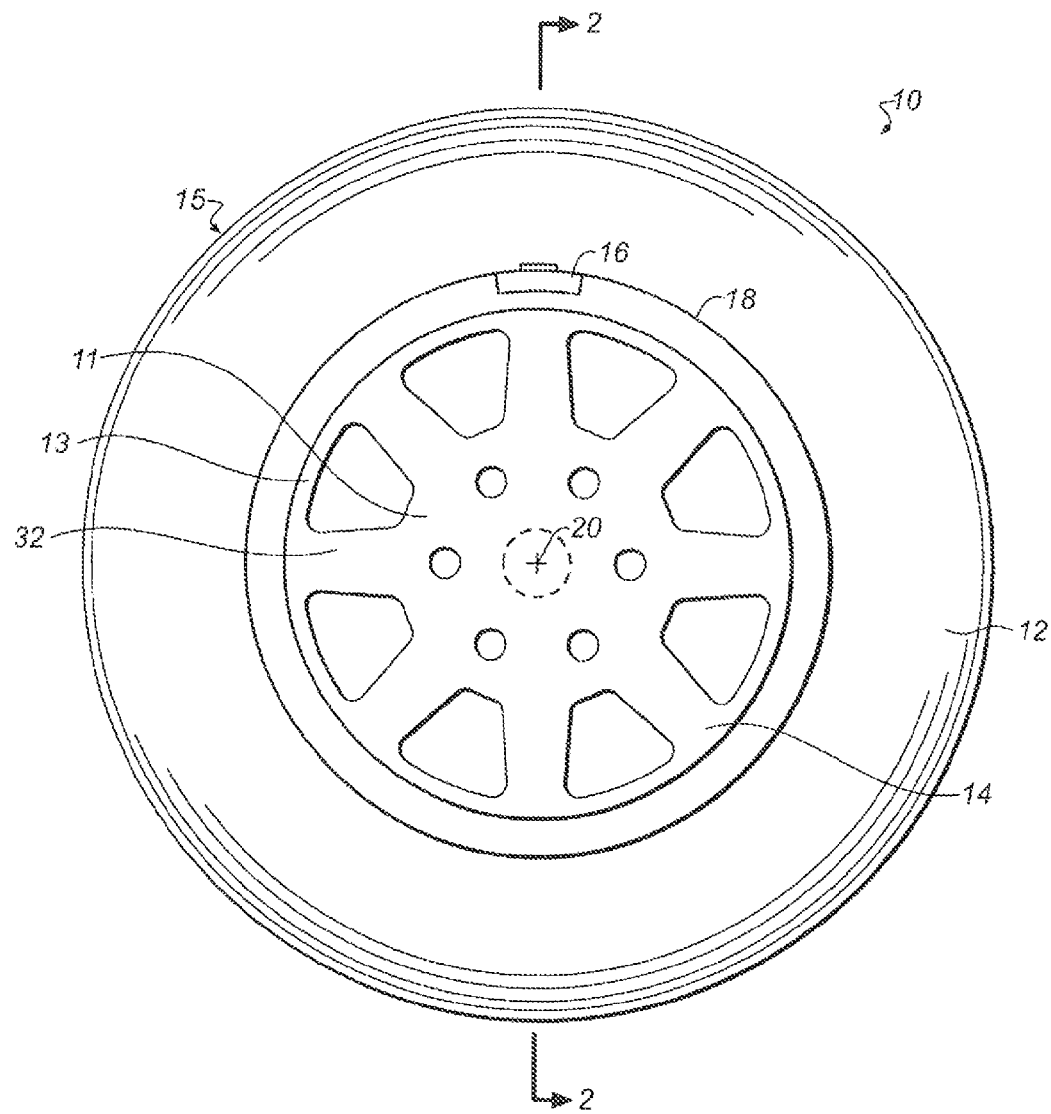
FIG. 1 is an elevational view of a mounted tire showing a prior art arrangement for rotational balancing.

Corresponding reference characters indicate corresponding parts throughout the several views. The exemplifications set out herein illustrate several currently preferred embodiments of the invention, and such exemplifications are not to be construed as limiting the scope of the invention in any manner.

DESCRIPTION OF THE PREFERRED EMBODIMENTS

Figure 2:
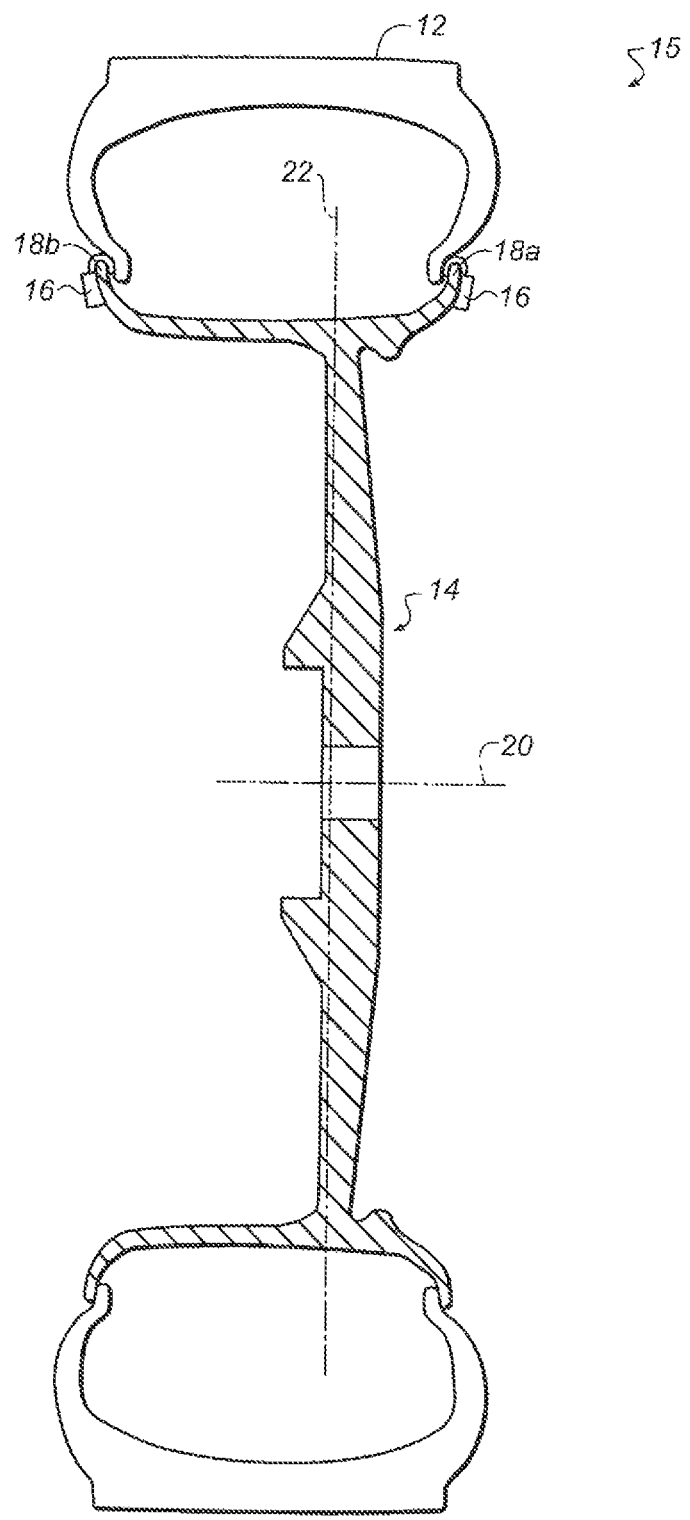
FIG. 2 is a cross-sectional view taken along line 2-2 in FIG. 1.

Referring to FIGS. 1 and 2, in a prior art balancing arrangement 10 as commonly practiced today, the degree of imbalance and the azimuthal location of the maximum imbalance is determined for a tire 12 mounted on a wheel 14 ("mounted tire" 15, as defined hereinabove). Wheel 14 may be thought of as comprising a hub portion 11, a flange portion 13 for accepting a tire 12, and optionally a plurality of spokes 32 connecting hub portion 11 to flange portion 13. A technician then attaches one or more appropriate weights 16 to the rim flange 18 of wheel 14 at a point opposite from the maximum imbalance. As shown in FIG. 2, the weight 16 may divided between the inner rim flange 18*a* and the outer rim flange 18*b* of the wheel 14, or it may be installed entirely on the inner rim flange 18*b* for cosmetic purposes.

Prior art arrangement 10 results in mounted tire 15 having a center of rotation that coincides with the axis of rotation 20 of the vehicle axis. However, a source of imbalance still exists because the weights are not necessarily disposed in the central plane of mass 22 of the mounted tire, as described above.

Figure 3:
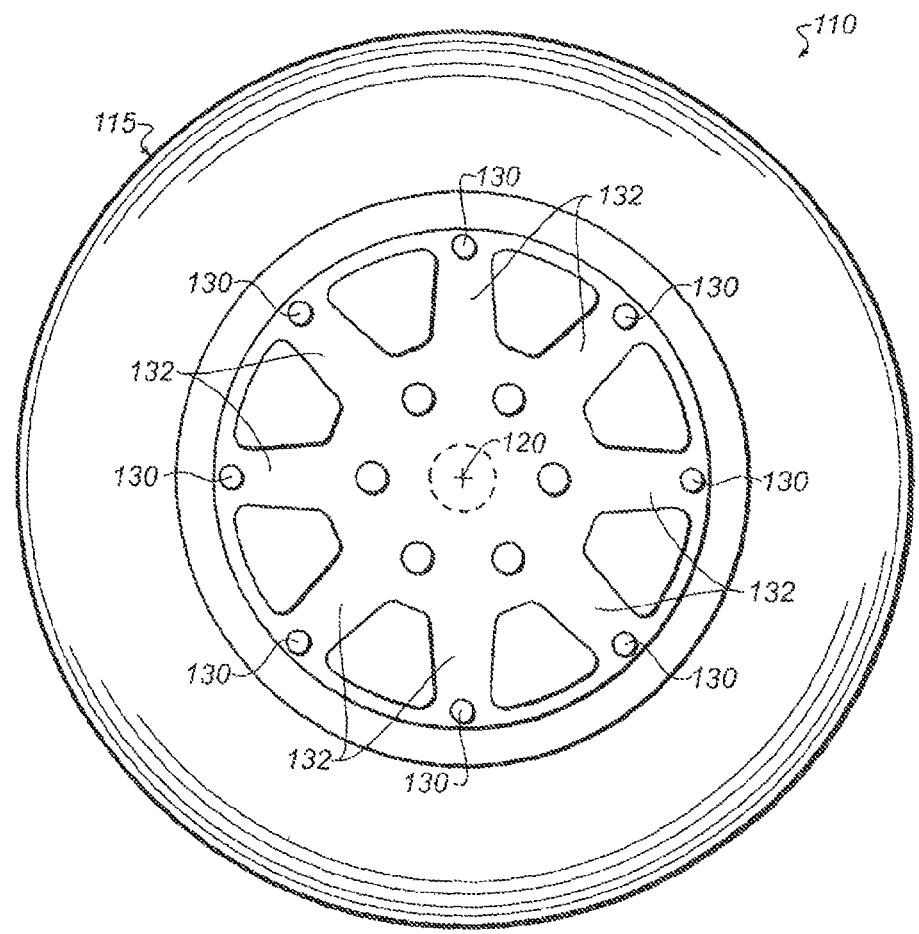
FIG. 3 is an elevational view of a mounted tire, showing disposition of a plurality of balancing tubes on the wheel in accordance with a first embodiment of the present invention.
Figure 4:
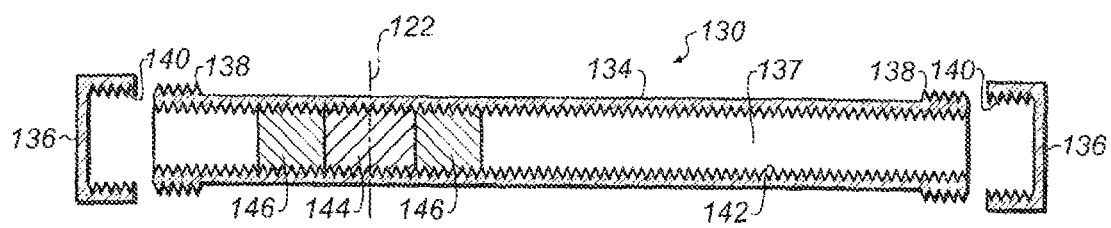
FIG. 4 is a cross-sectional view of an exemplary balancing tube and weight in accordance with the present invention.

Referring now to FIGS. 3 and 4, in a first exemplary embodiment 110 in accordance with the present invention, a plurality of balancing tubes 130 are disposed through spokes 132 of wheel 114 in approximate though not necessarily exact parallel alignment with rotational axis 120. As used herein, the terms "approximate" and "approximately" should be taken to mean and include any and all such non-parallel orientations of balancing tubes 130 to rotational axis 120, up to a misalignment of 30 degrees. Although the present invention envisions as few as two balancing tubes 130, preferably a larger number, e;g, eight as shown, is provided, disposed at equal azimuthal intervals around wheel 114. It may be desirable to provide as many as 24 or even 32 balancing tubes. Preferably although not necessarily, tubes 130 are all equidistant from rotational axis 120. Tubes 130 extend across the central plane of mass 122 of mounted tire 115 and may be either formed as part of the initial wheel-forming process or retro-fitted to an existing wheel. Tubes 130 may or may not be coincident with the wheel spokes.

Each exemplary tube 130 comprises a tubular central member 134, formed of metal or plastic, that is preferably provided with a cap 136 at each end. Each tubular central member 134 is fixedly attached (not shown) to wheel 114, such as by adhesives, welding, or press-fitting as is well known in the attachment arts. Exemplarily, each end of tube 130 is male threaded 138 and each cap 136 is female threaded 140 for securing caps 136 to tubular central member 134. Further, the bore 137 of tubular central member 134 is female threaded 142 to assist in positioning of a male threaded balancing weight 144 symmetrically in the central plane of mass 122. Weight 144 is secured in this position as by, e.g., thread-locking fluid and/or driven or threaded plugs 146. For most passenger automotive applications, the diameter of bore 137 is between about 7 mm and about 12 mm although other bore diameters are fully comprehended by the invention, as may be needed for, truck tires, airplane tires, and go-kart tires.

A tube 130 may have a simple bore, and weight 144 may have a smooth, preferably cylindrical, exterior, allowing weight 144 to press-fitted into tube 130 to the correct axial position and then held in place by friction between tube 130 and weight 144.

In some applications, it can be desirable within the scope of the present invention to employ more than one weight 144 within a given balancing tube 130, and neither of the weights may be positioned on the central plane of mass 122 although the resultant mass of the combination of weights normally will fall precisely on the central plane of mass 122. The present invention also contemplates having a plurality of balancing weights positioned within a plurality of balancing tubes.

Figure 5:
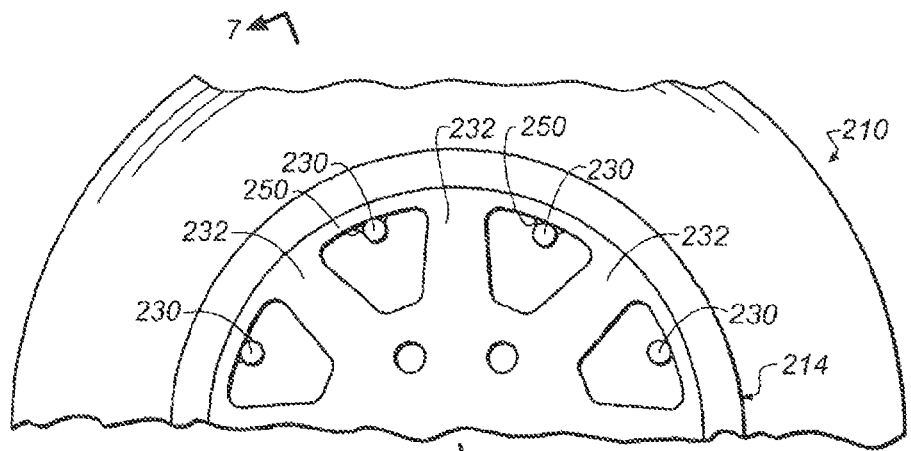
FIG. 5 is an elevational view of a portion of a mounted tire, showing disposition of a plurality of balancing tubes on the wheel in accordance with a second embodiment of the present invention.
Figure 7:
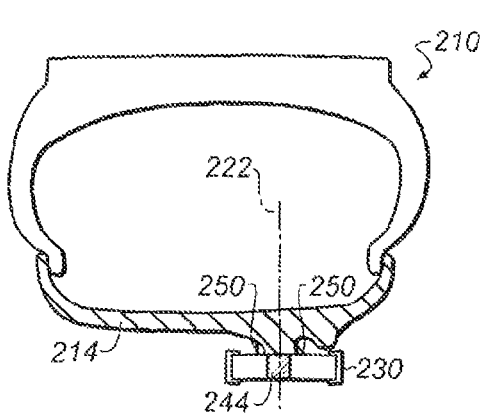
FIG. 7 is a cross-sectional view taken along line 7-7 in FIG. 5, showing a balancing weight disposed in a balancing tube in the plane of central mass of the mounted tire.

Referring now to FIGS. 5 and 7, in a second exemplary embodiment 210 in accordance with the present invention, a plurality of balancing tubes 230 are disposed between spokes 232 of wheel 214 and attached via welding 250 or the like. Weight 244 is disposed on the mounted tire central plane of mass 222. This configuration might be used for a convenient retro-fit of a conventional non-equipped wheel.

Figure 6:
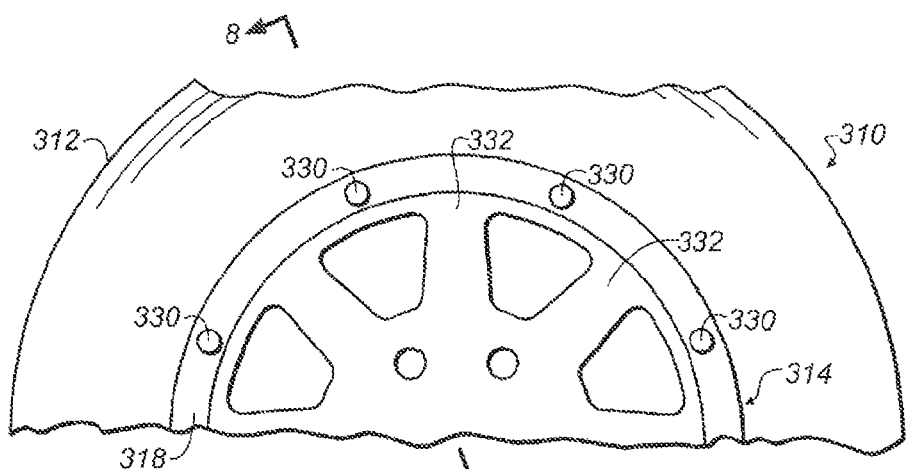
FIG. 6 is an elevational view of a portion of a mounted tire, showing disposition of a plurality of balancing tubes on the wheel in accordance with a third embodiment of the present invention.
Figure 8:
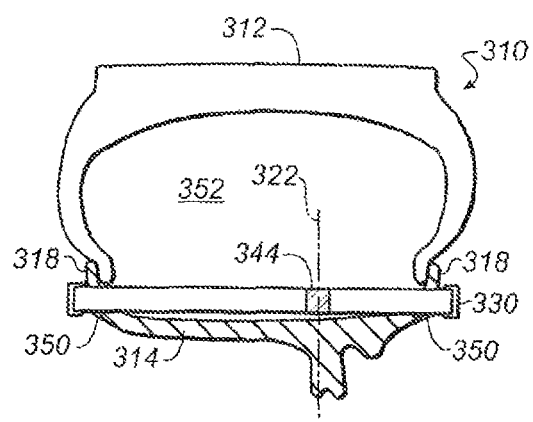
FIG. 8 is a cross-sectional view taken along line 8-8 in FIG. 6, showing a balancing weight disposed in a balancing tube in the plane of central mass of the mounted tire.

Referring now to FIGS. 6 and 8, in a third exemplary embodiment 310 in accordance with the present invention, a plurality of balancing tubes 330 are disposed through the rim flange(s) 318 of a wheel 314 and attached via welding 350 or the like. Weight 344 is disposed on the mounted tire central plane of mass 322. This configuration might be used for an original manufacture of a wheel. Note that tube 330 is positioned to pass through the captive airspace 352 of a tubeless tire 312, requiring that each tube 330 be dependably sealed where it passes through each rim flange 318.

Weight 344 may be secured in position within the tube by press-fitting, through the use of adhesives, or any other suitable technique. In addition, weights 344 may be free to slide within the tube. In this case, low-density spacers are cut to length and placed on either side of weight 344. The end caps are then added to secure the weight and the spacers.

Although the balancing tubes have been illustrated as separate elements which are added to the wheel assembly, this need not always be the case. As those skilled in the art will know, it is possible to make the balancing tubes integral with the wheel itself (at least for some wheel designs). FIG. 3 depicts a wheel which is suitable for this approach. This is particularly true for a cast wheel. Balancing tubes 130 may simply be holes that are cast or drilled into the wheel material. These may optionally be threaded in a secondary operation. The balancing weight may then be an externally threaded plug or even a specially-weighted bolt that includes a suitable driving head. A balancing tube of this configuration is "attached" to the wheel by being integrally formed with the wheel.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A wheel and tire assembly for rotational use on a vehicle, said wheel and tire assembly having a rotation axis and a combined central plane of mass lying perpendicular to said rotation axis, comprising:
   a) a hub portion;
   b) a flange portion attached to said hub portion, said flange portion having an outer rim flange lying on a first side of said central plane of mass and an inner rim flange lying on a second side of said central plane of mass;
   c) a plurality of balancing tubes attached to said wheel in a longitudinal direction approximately parallel to said rotation axis;
   d) each of said balancing tubes having a first end and a second end, with said first end lying proximate said outer rim flange and said second end lying proximate said inner rim flange, each of said balancing tubes spanning across said central plane of mass; and
   e) at least one balancing weight axially disposable in a one of said balancing tubes such that when a tire is mounted to said flange portion said weight may be positioned in said balancing tube to effect both azimuthal and longitudinal balance of the combined wheel and tire said at least one balancing weight being configured to be positioned at any desired longitudinal position within said balancing tube.

2. A combined wheel and tire, said wheel and tire having a rotation axis and a combined central plane of mass lying perpendicular to said rotation axis, comprising:
   a) a hub portion;
   b) a flange portion attached to said hub portion and supportive of said tire, said flange portion having an outer rim flange lying on a first side of said central plane of mass and an inner rim flange lying on a second side of said central plane of mass;
   c) a plurality of balancing tubes attached to said wheel in a longitudinal direction approximately parallel to said rotation axis;
   d) each of said balancing tubes having a first end and a second end with said first end lying proximate said outer rim flange and said second end lying proximate said inner rim flange, each of said balancing tubes spanning across said central plane of mass; and
   e) at least one balancing weight axially disposable in a one of said balancing tubes to effect both azimuthal and longitudinal balance of said combined wheel and tire, said at least one balancing weight being configured to be positioned at any desired longitudinal position within said balancing tube.

3. A combined wheel and tire in accordance with claim 2 wherein said plurality of balancing tubes are attached to said flange portion.

4. A combined wheel, and tire in accordance with claim 2 wherein at least one of said balancing tubes passes through an outer rim flange and an inner rim flange and the air space therebetween.

5. A combined wheel and tire in accordance with claim 2 wherein said hub portion and said flange portion are connected by a plurality of spokes, and wherein at least one of said balancing tubes is disposed through a one of said spokes.

6. A combined wheel and tire in accordance with claim 2 wherein said weight is disposed on said central plane of mass.

7. A combined wheel and tire in accordance with claim 2 wherein said balancing weight is a first balancing weight, and wherein a second balancing weight is also disposed in said one of said balancing tubes.

8. A combined wheel and tire in accordance with claim 2 wherein said balancing weight is a first balancing weight, and wherein a second balancing weight is disposed in a second of said balancing tubes.

9. A combined wheel and the in accordance with claim 2 wherein said one balancing tube comprises:
   a) a central tube portion; and
   b) at least one end cap.

10. A combined wheel and tire in accordance with claim 9 wherein said central tube portion is internally threaded, and wherein said weight is externally threaded to facilitate positioning of said weight axially in said tube.

11. A combined wheel and tire in accordance with claim 2 wherein said balancing tubes are equidistant from the rotational axis of said combined wheel and tire.

12. A combined wheel and tire in accordance with claim 2 wherein said plurality of balancing tubes are disposed at equal azimuthal intervals around said wheel.

13. A combined wheel and tire in accordance with claim 2 wherein the number of said plurality of balancing tubes is between two and about thirty-two.

\* \* \* \* \*